(12) United States Patent
Wang et al.

(10) Patent No.: US 6,778,873 B1
(45) Date of Patent: Aug. 17, 2004

(54) IDENTIFYING A CAUSE OF A FAULT BASED ON A PROCESS CONTROLLER OUTPUT

(75) Inventors: Jin Wang, Austin, TX (US); Elfido Coss, Jr., Austin, TX (US); Brian K. Cusson, Austin, TX (US); Alexander J. Pasadyn, Austin, TX (US); Michael L. Miller, Cedar Park, TX (US); Naomi M. Jenkins, Round Rock, TX (US); Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 70 days.

(21) Appl. No.: 10/210,640

(22) Filed: Jul. 31, 2002

(51) Int. Cl.[7] ............................................... G06F 19/00
(52) U.S. Cl. ...................... 700/110; 700/109; 700/121; 702/84
(58) Field of Search ............................. 700/109, 110, 700/121; 702/84; 438/5

(56) References Cited

U.S. PATENT DOCUMENTS

| | | | | |
|---|---|---|---|---|
| 5,408,405 A | * | 4/1995 | Mozumder et al. | 700/31 |
| 5,818,713 A | * | 10/1998 | Uchihara et al. | 700/79 |
| 5,923,553 A | * | 7/1999 | Yi | 700/110 |
| 6,230,069 B1 | * | 5/2001 | Campbell et al. | 700/121 |
| 6,263,255 B1 | * | 7/2001 | Tan et al. | 700/121 |
| 6,462,313 B1 | * | 10/2002 | Sandhu | 219/497 |
| 6,616,759 B2 | * | 9/2003 | Tanaka et al. | 118/63 |
| 2003/0055524 A1 | * | 3/2003 | Firth et al. | 700/109 |
| 2003/0109945 A1 | * | 6/2003 | Cho et al. | 700/95 |
| 2003/0199108 A1 | * | 10/2003 | Tanaka et al. | 438/14 |

* cited by examiner

*Primary Examiner*—Leo Picard
*Assistant Examiner*—Elliot Frank
(74) *Attorney, Agent, or Firm*—Williams, Morgan & Amerson, P.C.

(57) ABSTRACT

A method and apparatus is provided for identifying a cause of a fault based on controller output. The method comprises processing at least one workpiece under a direction of the controller and detecting a fault associated with the processing of the at least one workpiece. The method further includes determining a plurality of possible causes of the detected fault, identifying a more likely possible cause out of the plurality of possible causes, providing fault information associated with the identified more likely possible cause to the controller. The method further includes providing fault information associated with the identified more likely possible cause to the controller. The method further comprises adjusting the processing of one or more workpieces to be processed next based on the fault information provided to the controller. The method further includes generating prediction data associated with processing of the next workpieces, and comparing the prediction data to processing data associated with the processing of the next workpieces to identify a possible cause of the fault.

27 Claims, 4 Drawing Sheets

IDENTIFYING A CAUSE OF A FAULT BASED ON A PROCESS CONTROLLER OUTPUT

BACKGROUND OF THE INVENTION

1. Field of the Invention

This invention relates generally to a semiconductor fabrication process, and, more particularly, to identifying a potential cause of a fault in the semiconductor fabrication process based on an output from a process controller.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process steps may result in device performance variations. Factors, such as feature critical dimensions, doping levels, contact resistance, particle contamination, etc., all may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Semiconductor manufacturing processes, which have become more reliable and robust over the past few years, may include a plurality of processing tools that cooperate with each other to process semiconductor devices, such as microprocessors, memory devices, ASICs, etc. To verify that the processing tools are operating within acceptable parameters, it has become increasingly desirable to monitor the operating conditions of such processing tools.

Today's semiconductor manufacturing processes may include an intricate network of multiple processing tools for manufacturing semiconductor devices. Linking multiple processing tools may provide numerous advantages in the manufacture of semiconductor devices, but there can, however, be some drawbacks, particularly from the standpoint of troubleshooting problems or faults because of the system dynamics and the generally closed-loop nature of the manufacturing system. For example, identifying the real underlying cause of a fault may prove to be challenging because the effects of even a single fault can easily permeate through the manufacturing process, thereby increasing the number of variables that may need to be considered before the true source of the fault can be identified. Failing to timely identify the source of the detected faults may naturally delay any potential corrective measures that can be taken to address the problem. Because of these delays, the operation of the semiconductor manufacturing process may be adversely affected, thereby resulting in a potential increase in costs for the manufacturer and consumer.

The present invention is directed to overcoming, or at least reducing the effects of, one or more of the problems set forth above.

SUMMARY OF THE INVENTION

In one embodiment of the present invention, a method is provided for identifying a cause of a fault based on a process controller output. The method comprises processing at least one workpiece under a direction of the controller, detecting a fault associated with the processing of the at least one workpiece and providing fault information associated with the detected fault to the controller. The method further comprises adjusting the processing of one or more workpieces to be processed next based on the fault information provided to the controller.

In another embodiment of the present invention an apparatus is provided for identifying a cause of a fault based on an output of a control unit. The apparatus comprises an interface and the control unit communicatively coupled to the interface. The interface is adapted to receive operational data associated with processing a lot of semiconductor wafers. The control unit is adapted to detect a fault based on the operational data, determine fault information related to a possible cause of the detected fault and provide the fault information to a process controller that is capable of enabling processing of a next lot of semiconductor wafers based on the fault information.

In a further embodiment of the present invention, an article comprising one or more machine-readable storage media containing instructions is provided for identifying a cause of a fault based on an output of a control unit. The one or more instructions, when executed, enable the processor to detect a fault based on receiving operational data associated with processing of one or more wafers, determine fault information related to a possible cause of the detected fault and provide the fault information to the control unit that is capable of adjusting a processing of at least one of a next wafer based on the fault information.

In a further embodiment of the present invention, a system is provided for identifying a cause of a fault based on an output of a control unit. The system comprises a processing tool, a fault detection and classification system and the control unit. The processing tool is adapted to provide operational data associated with a processing of one or more wafers. The fault detection and classification system is adapted to detect a fault based on the operational data, determine information related to a possible cause of the detected fault and provide the fault information. The control unit is adapted to adjust a processing of at least one wafer to be processed next based on the fault information.

BRIEF DESCRIPTION OF THE DRAWINGS

The invention may be understood by reference to the following description taken in conjunction with the accompanying drawings, in which like reference numerals identify like elements, and in which.

Figure 1:
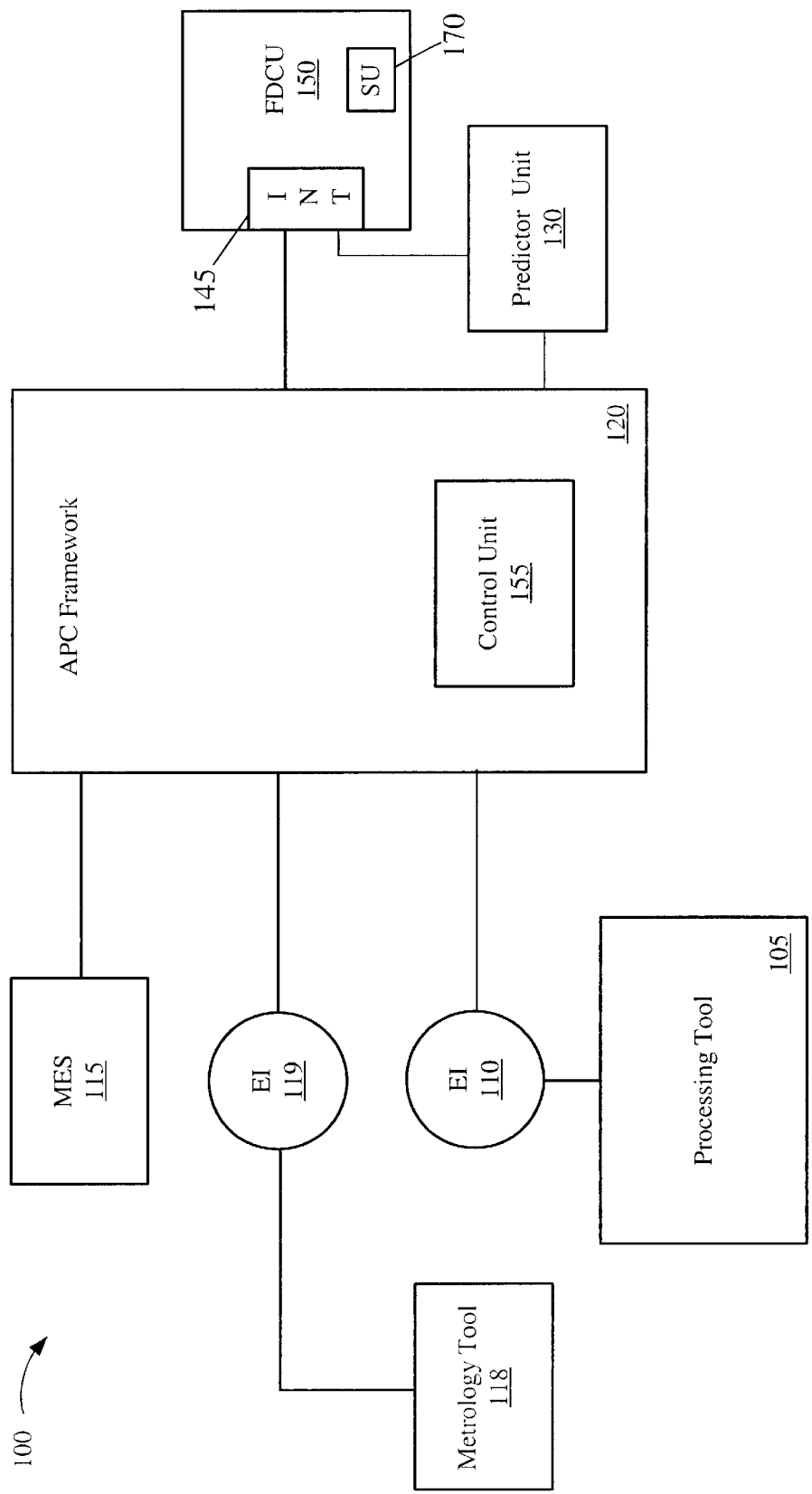
FIG. 1 illustrates a manufacturing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers'specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a manufacturing system 100 for performing a semiconductor fabrication process is provided. The manufacturing system 100 includes a processing tool 105, which in the illustrated embodiment are coupled to an Advanced Process Control (APC) framework 120 through an equipment interface (EI) 110. The manufacturing system 100 may include a manufacturing execution system (MES) 115, and a metrology tool 118 that is coupled to the APC frame work 120 via an EI 119. The manufacturing system 100, in the illustrated embodiment, also includes a predictor unit 130 coupled between the APC framework 120 and an interface 145 of a fault detection and classification (FDC) unit 150. The APC framework 120 includes a process control unit 155 that, through a feedback process, aids the processing tool 105 towards producing a desired result defined by a recipe. In the illustrated embodiment, the APC framework 120 is coupled to the FDC unit 150 through the interface 145, where the interface 145 may be any acceptable structure(s) that allow(s) the FDC unit 150 to communicate with other devices. The FDC unit 150 may include a storage unit (SU) 170.

As described in more detail below, in accordance with one or more embodiments of the present invention, the FDC unit 150 and the control unit 155 operate cooperatively to narrow the possible causes of faults that are detected in the manufacturing system 100. In one embodiment, the actual cause of a fault may be determined and a corrective action may be taken to fix the fault.

The processing tool 105 in the illustrated embodiment may take the form of any semiconductor fabrication equipment used to produce a processing piece, such as a silicon wafer. The techniques described herein may be applied to a variety of workpieces including, but not limited to, microprocessors, memory devices, digital signal processors, application specific integrated circuits (ASICs), or other similar devices. An exemplary processing tool 105 may include an exposure tool, etch tool, deposition tool, polishing tool, rapid thermal processing tool, test-equipment tool, implantation tool, and the like. It should be appreciated that the processing tool 105 need not necessarily be limited to processing silicon wafers, but may produce a variety of different types of commercial products without departing from the spirit and scope of the present invention. Additionally, although FIG. 1 illustrates only one processing tool 105, it should be appreciated that the manufacturing system 100 may employ a plurality of processing tools 105, depending on the implementation goals.

As mentioned, in the illustrated embodiment, the processing tool 105 is coupled to the equipment interface (EI) 110, which interfaces the processing tool 105 to the manufacturing execution system (MES) 115. The manufacturing execution system 115 manages and controls the overall operation of the processing tool 105. For example, the manufacturing execution system 115 may determine what processes are to be performed by the processing tool 105, when these processes are to be performed, how these processes are to be performed, etc.

The metrology tool 118 may also be coupled to the equipment interface 110 to retrieve wafer-related data that characterizes the quality of the wafer that is processed by the processing tool 105. The wafer product data is generated from specific quantitative and/or qualitative measurements that are taken from the wafer by the metrology tool 118. For example, the wafer product data may include film thickness measurements, line width measurements, and/or overlay offset measurements of the wafer. It will be appreciated that these specific measurements that define the wafer product data are merely exemplary. Accordingly, various other measurements may also be taken to determine whether the wafers that are being processed by the processing tool 105 possess the quantitative or qualitative characteristics desired. The specific manner in which the wafer product data is obtained by the metrology tool 118 is well known to those of ordinary skill in the art and the details of such will not be discussed herein to avoid unnecessarily obscuring the present invention.

The equipment interface 110 may retrieve metrology data from the metrology tool 118 and communicate this data to the APC framework 120, which may include a control unit 155 for managing at least the overall operations of the APC framework 120. In addition, the processing tool 105 or a sensor external (not shown) to the processing tool 105 may provide data related to the processing of the semiconductor wafers to the APC framework 120. The metrology data or any other data related to the processing of the semiconductor wafers is hereinafter referred to as "operational data."

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The control unit 155 calculates new recipe parameters based on the operational data received from the processing tool 105 and based on information (described in greater detail below) provided by the FDC unit 150. The new recipe parameters aid the processing tools 105 in moving toward a desired result (or target). The new recipe parameters are also provided to the predictor unit 130, which predicts the results expected from the processing tool 105 when the next semiconductor wafers are processed.

The FDC unit 150 is adapted to detect and classify faults associated with the processing tool 105. Faults may occur in a manufacturing process for various reasons, including occurrence of an unknown disturbance, hardware failure, depletion of resources (e.g., gases, liquids, chemicals), and the like. The faults may be detected in several ways, including based on analyzing the metrology data provided by the metrology tool 118 or the data provided by the processing tool 105. The FDC unit 150, for example, may detect a fault associated with the processing tools 105 if the received metrology data indicates that values measured from the wafers are outside an acceptable range. The FDC unit 150, in another embodiment, may also detect a fault based on comparing the received operational data from the processing tool 105 to fault model data. The fault model data includes operational data of other similar-type tools, where it was previously known that such tools had operated within acceptable operational limits.

Once the fault is detected, the FDC unit 150 determines one or more possible causes of the detected fault, a process sometimes also referred to as "classification." In one embodiment, the FDC unit 150 determines one or more possible causes based on a fault distribution chart, an example of which is discussed below. The FDC unit 150 provides information associated with the possible causes of the detected fault to the control unit 155 of the APC framework 120. The control unit 155, based on the provided information, may make adjustments to the operating recipe parameters for processing the semiconductor wafers. In one embodiment, the information from the FDC unit 150 is also provided to the predictor unit 130.

The predictor unit 130 is a representative model of the process that is being performed on the semiconductor wafers by the processing tool 105. The predictor unit 130 predicts the next output of the process based on the information provided by the FDC unit 150 relating to the potential cause of the fault that was previously detected and based on the output of the control unit 155. The output data from the predictor unit 130 is provided to the FDC unit 150, which compares the output data to the actual operational data received from the processing tool 105 to narrow the potential causes of the fault detected in the manufacturing system 100, and, in some cases, identify the actual cause of the fault.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the MES 115 may interface with the APC framework 120 through an associated equipment interface (not shown). Furthermore, in one embodiment, the various components of the system 100, such as the tools 105, 118, may interface with the APC framework through a common equipment interface. Additionally, it should be noted that although various components, such as the equipment interfaces 110, 119 of the system 100 of FIG. 1 are shown as stand-alone components, in alternative embodiments, such components may be integrated into the processing tools 105 or metrology tool 118. Similarly, the fault detection and process control units 150 and/or predictor unit 130 may be integrated into the APC framework 120.

Figure 2:
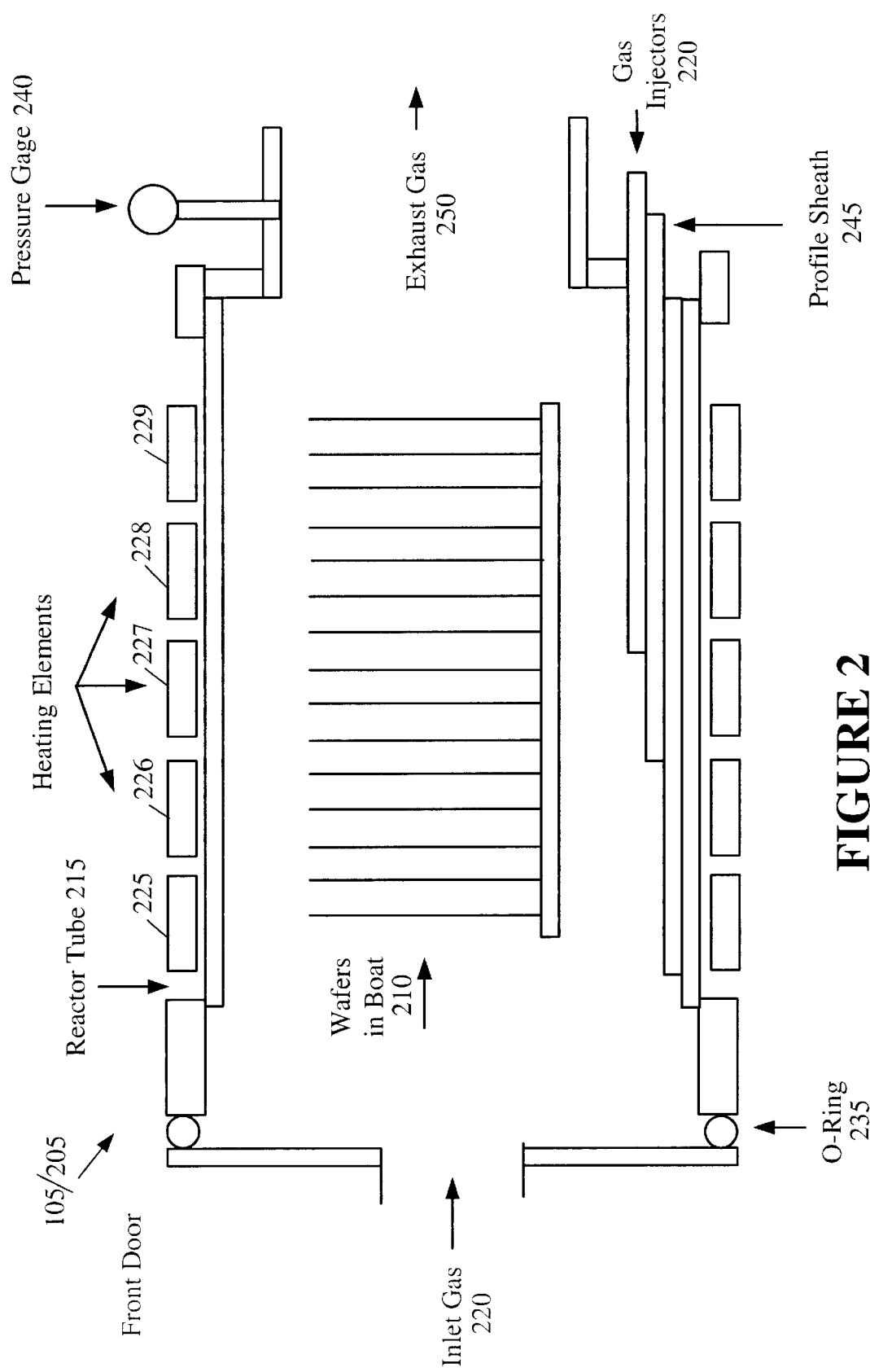
FIG. 2 illustrates a block diagram of a processing tool that may be employed in the manufacturing system of FIG. 1, in accordance with one embodiment of the present invention.

Turning now to FIG. 2, a stylistic block diagram of the processing tool 105 of the manufacturing system 100 is provided. In the illustrated embodiment of FIG. 2, the processing tool 105 is a Low Pressure Chemical Vapor Deposition (LPCVD) Furnace 205. In the LPCVD furnace 205, the semiconductor wafers 210 are placed perpendicular to the main direction of gas flow and inside a reactor tube 215. As chemical reagents (e.g., gas) are injected through one or more inlets 220, chemical reactions occur that cause silicon thin films, for example, to be deposited on the surfaces of the semiconductor wafers 210. The surfaces of the semiconductor wafers 210 are heated by five independently controlled heating elements 225–229 of the LPCVD furnace 205 in the illustrated embodiment. The LPCVD furnace 205 may also include an O-ring 235, pressure gauge 240, profile sheath 245, and gas exhaust 250.

The uniformity and rate of deposition are some of the factors that may affect the operation of the LPCVD furnace 205. For successful operation, two control objectives that are commonly monitored are the target deposition thickness and wafer-to-wafer uniformity, which may be affected by an insufficient power input level to the heating elements 225–229, inadequate reactant concentrations (molar fraction of different components), low gas flow rate and pressure, and the like.

If a group of the semiconductor wafers 210 at the output of the LPCVD furnace 205 have a deposition thickness that is less than a target level, for example, a fault may be detected by the FDC unit 150. Upon detecting the fault, the FDC unit 150 may determine one or more possible causes of the fault. The one or more possible causes of the detected fault may be reflected in a fault distribution chart, which may be generated by the FDC unit 150 using fault component analysis, a well-known technique to those skilled in the art. An exemplary fault distribution chart corresponding to the LPCVD furnace 205 of FIG. 2 is illustrated in FIG. 3.

Figure 3:
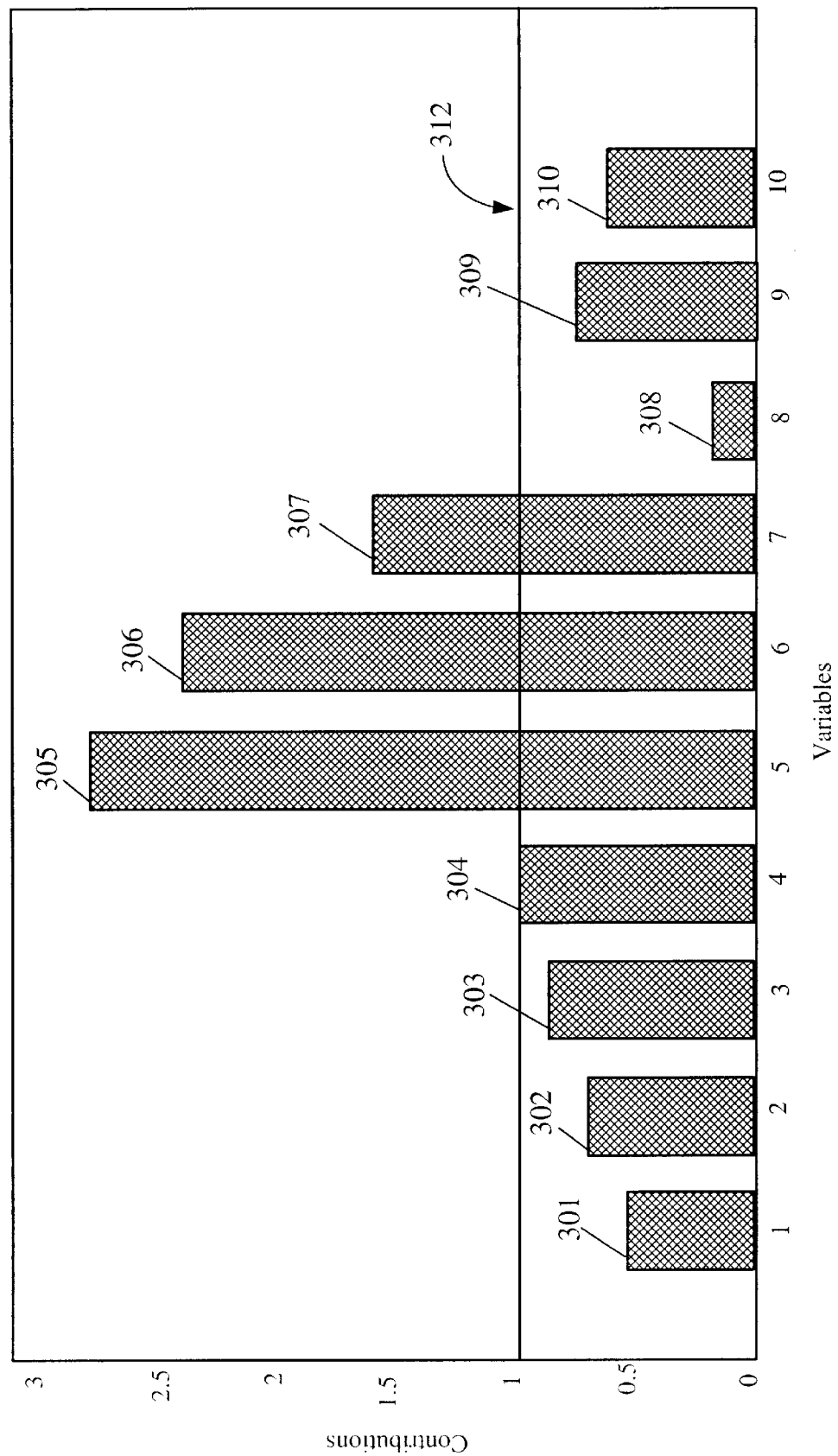
FIG. 3 depicts an exemplary fault distribution chart associated with the processing tool of FIG. 2, in accordance with one embodiment of the present invention.

The exemplary fault distribution chart of FIG. 3 depicts the various possible causes of a fault previously detected by the FDC unit 150 and the likelihood of each of the various possible causes being the actual cause of the detected fault. As can be seen in the illustrated example, ten different variables are indicated as a potential source of the fault. The size of each bar graph represents the likelihood of that respective variable being the actual cause of the fault. Although only exemplary in nature, the bar graphs 301–305 of the depicted fault distribution chart represent the likelihood that the fault was caused by the first, second, third, fourth, and fifth heating elements 225–229, respectively, of the LPCVD furnace 205 of FIG. 2. The heating elements 225–229 may have caused the faults because of an inadequate input power supply level, for example, to these heating elements 225–229. In FIG. 3, the bar graphs 306–308 represent the potential contribution respectively due to a low gas flow rate, concentration of reactants, and pressure in the LPCVD furnace 205. The bar graphs 309–310 similarly represent other possible causes of the fault and their respective potential contribution towards the detected fault. Also shown in FIG. 3 is a confidence limit line 312, which has a scaled value of substantially one in this case, and is typically calculated based on the history data of the process and the control target. The confidence limit line 312 may be used to decide whether a particular variable is a possible contribution to the fault.

As can be seen, the relative larger size of the bar graph 305 and bar graph 306 indicate that a low input power level to the fifth element 229 and an inadequate gas flow rate in the LPCVD furnace 205, respectively, are the two most likely causes of the detected fault. As described below, the FDC unit 150 provides fault information, such as the potential causes of the detected fault, to the control unit 155 of the APC framework 120 and to the predictor unit 130 to aid in determining the actual cause of the fault.

Figure 4:
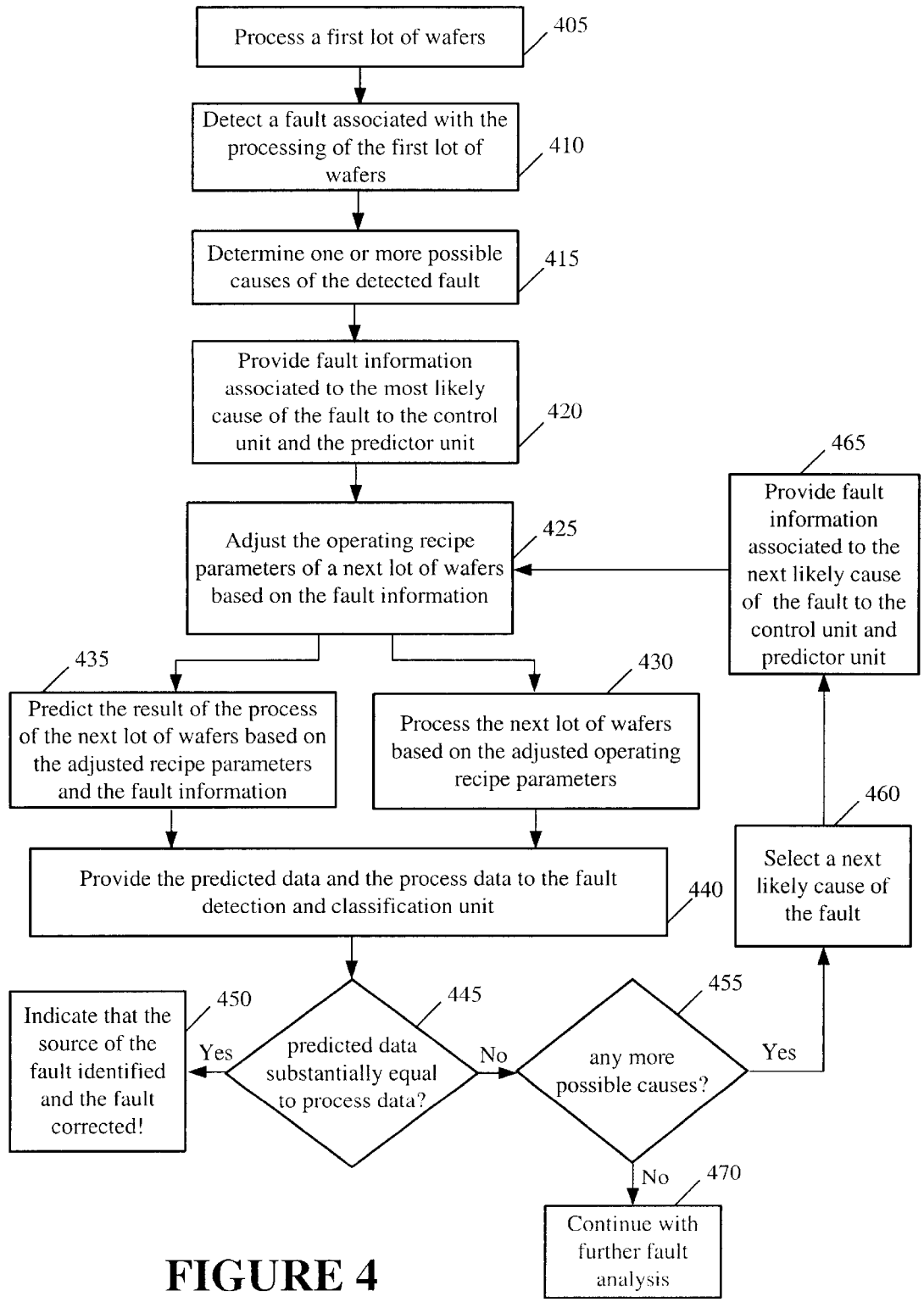
FIG. 4 illustrates a flow diagram of a method that may be implemented in the manufacturing system of FIG. 1, in accordance with one embodiment of the present invention.

Referring now to FIG. 4, a flow diagram of a method that may be implemented in the manufacturing system 100 of FIG. 1 is illustrated, in accordance with one embodiment of the present invention. For illustrative purposes, the method of FIG. 4 is described in the context of the LPCVD furnace 205 of FIG. 2 and the fault distribution chart of FIG. 3.

In the method of FIG. 4, the LPCVD furnace 205 processes (at 405) a first lot of semiconductor wafers. The FDC unit 150 detects (at 410) a fault associated with the LPCVD furnace 205. The fault may be detected (at 410) in any one of a variety of ways. For example, the FDC unit 150 may detect a fault based on the metrology data received from the metrology tool 118, if the metrology data indicates that the measured parameters of the semiconductor wafers are outside the range of acceptable parameters. As another example, the FDC unit 150 may detect (at 410) a fault based on receiving the operational data from the processing tool 105 and then comparing the received operational data with the fault model data. As mentioned earlier, a variety of faults may be detected in the manufacturing system 100, including processing faults and operational faults.

Upon detecting the fault (at 410), the FDC unit 150 determines (at 415) one or more possible causes of the fault. As noted, in one embodiment, the one or more possible causes of the detected fault may be reflected in a fault distribution chart, such as that shown in FIG. 3. In the fault distribution chart of FIG. 3, there are three likely possible causes of faults, namely a low power input level to the fifth heating element 229, inadequate gas flow rate in the LPCVD furnace 205, and the insufficient concentration of reactants in the LPCVD furnace 205, as denoted by the bar graphs 305, 306, 307, respectively.

The FDC unit 150 provides (at 420) fault information associated with the most likely cause (relative to other possible causes) of the fault to the control unit 155 and the predictor unit 130. The term "most," as utilized herein, does not refer to the absolute "most likely" cause, but rather to a cause that is more likely to be the cause of a fault when compared to the other known possible causes. In the fault distribution chart of FIG. 3, as indicated by the large size of the bar graph 305 (compared to the other bar graphs), the most likely cause is the fifth heating element 229 of the LPCVD furnace 205. Thus, in the illustrated example of the fault distribution chart of FIG. 3, the FDC unit 150 indicates to the control unit 155 and predictor unit 130 that the most likely cause of the detected fault is the lack of input power to the fifth heating element 229 of the LPCVD furnace 205.

Based on the fault information provided by the FDC unit 150, the control unit 155 adjusts (at 425) one or more of the operating recipe parameters for the process that is to be performed by the LPCVD furnace 205 on a next lot of wafers. The control unit 155, for example, may increase the power input to the fifth heating element 229 based on the fault information provided by the FDC unit 150. If the identified potential cause is a low pressure in the chamber, the control unit 155 may take corrective action to increase the pressure in the chamber of the LPCVD furnace 205. Similarly, the control unit 155 may make other type of adjustments to the process based on the fault information provided by the FDC unit 150.

The adjusted parameters are provided to the predictor unit 130 and LPCVD furnace 205. The LPCVD furnace 205 processes (at 430) a next lot of wafers based on the parameters adjusted by the control unit 155. Also, the predictor unit 130, based on the adjusted parameters (at 425) as well as the fault information provided (at 420) by the FDC unit 150, predicts (at 435) the expected output of the LPCVD furnace 205. The output data from the predictor unit 130 and the LPCVD furnace 205 is provided (at 440) to the FDC unit 150. The FDC unit 150 compares (at 445) the data from the predictor unit 130 and the LPCVD furnace 205 to determine if they are substantially equal.

If the predicted data and the process data are substantially equal (or close), then it is an indication that the actual cause of the fault has been detected and that the corrective action has been taken. This is because, the predictor unit 130, which is a representative model of the process, takes into account the fault information regarding the possible cause of the fault that is provided by the FDC unit 150. For example, assume that the actual cause of the fault is inadequate input power supply to the fifth heating element 229. The FDC unit 150 notifies the predictor unit 130 and the control unit 155 that the fifth heating element 229 is the likely cause of the fault. The predictor unit 130, which is a representative model of the process, takes into account that the fifth heating element 150 in the LPCVD furnace 205 is not receiving adequate power. Thus, when control unit 155 adjusts the operating recipe parameters to increase the power to the fifth heating element 229 and provides the operating recipe parameters to the predictor unit 130 and LPCVD furnace 205, the output of the predictor unit 130 and LPCVD furnace 205 should be close, if not substantially the same. If, on the other hand, the actual cause of the fault is low gas flow in the LPCVD furnace 205 (as opposed to the fifth heating element 229), and yet the predictor unit 130 compensates for the lack of power to fifth heating element 229 (as per the fault information provided by the FDC unit 150) instead of the low gas flow rate, then the output of the predictor unit 130 and the LPCVD furnace 205 are not likely to match. This is because the predictor unit 130 may be compensating for an inadequate power supply to the fifth heating element 229 even though, in reality, the problem lies with the gas flow rate in the LPCVD furnace 205. When the predictor unit 130 output and the LPCVD furnace 205 output do not match, it is an indication that the possible cause of the fault identified by the FDC unit 150 is not the actual cause of the fault. However, when the predicted data substantially matches (or is close to) the process data, the FDC unit 150 indicates (at 450) that the actual source of the fault has been identified and that the fault has been corrected.

If, however, it is determined (at 445) that the predicted data is not substantially equal to the process data, then the FDC unit 150 determines (at 455) if any more possible causes of the detected fault exists. In the illustrated exemplary fault distribution chart of FIG. 3, there are other possible causes, namely the inadequate gas flow (i.e., corresponding to the bar graph 306) and the inadequate concentration of the reactants (i.e., corresponding to the bar graph 307).

If there are additional possible causes of the fault, the FDC unit 150 selects (at 460) a next likely cause of the fault, which, in the illustrated example of FIG. 3, would be inadequate gas flow, as indicated by the next largest bar graph 306. The fault information associated with the next likely fault cause (e.g., inadequate gas flow) is provided (at 465) to the control unit 155 and the predictor unit 130. Based on the fault information that is associated with the next likely fault cause, the control unit 155 adjusts (at 425) the operating recipe parameter of a next lot of wafers. Thereafter, the process continues in a similar manner as to that described above.

The above-described process may be repeated for each possible fault cause until all of the fault causes have been considered. If all of the possible fault causes have been considered and the actual cause of the fault is not determined, a fab engineer may nevertheless continue (at 470) with further fault analysis, using various other techniques, to identify the actual cause of the detected fault.

It should be noted that the embodiment described herein with respect to the fault detection chart of FIG. 3 is exemplary in nature. Additionally, it should be appreciated that the concepts described herein may be readily extended to more complex scenarios involving coupled variables as well.

In accordance with one or more embodiments of the present invention, the FDC unit 150 works in concert with the control unit 155 to narrow the possible causes of a detected fault. In some instances, it may be possible to identify the actual cause of the fault in a relatively quick and efficient manner, thus improving the overall efficiency of the manufacturing process.

The various system layers, routines, or modules may be executable by the control unit 155 (see FIG. 1). As utilized herein, the term "control unit" may include a microprocessor, a microcontroller, a digital signal processor, a processor card (including one or more microprocessors or controllers), or other control or computing devices. The storage unit 170 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   processing at least one workpiece under direction of a controller;
   detecting a fault associated with the processing of the at least one workpiece;
   determining a plurality of possible causes of the detected fault;
   identifying a more likely possible cause out of the plurality of possible causes; providing fault information associated with the identified more likely possible cause
   to the controller; and
   adjusting the processing of one or more workpieces to be processed next based on the fault information provided to the controller.

2. The method of claim 1, wherein providing the fault information comprises providing the at least one of the determined possible causes of the detected fault to the controller.

3. The method of claim 2, wherein adjusting the processing comprises adjusting one or more operating recipe parameters for processing the next workpieces.

4. The method of claim 3, further comprising providing the fault information and the one or more operating recipe parameters to a predictor unit, wherein the predictor unit is representative of a process model for processing the next workpieces.

5. The method of claim 4, further comprising generating prediction data based on the one or more operating recipe parameters and the fault information associated with the detected fault.

6. The method of claim 5, further comprising comparing the prediction data and processed data, and, in response to determining that the predication data and the processed data do not substantially match, identifying a next likely possible cause out of the plurality of causes and providing fault information related to the identified next likely possible cause to the controller.

7. The apparatus of claim 5, further comprising comparing the prediction data and processed data, and, in response to determining that the predication data and the processed data substantially match, indicating a possible cause of the detected fault has been determined.

8. The method of claim 1, wherein detecting the fault comprises:
   receiving operational data related to the manufacture of the at least one workpiece by a processing tool, wherein the workpiece is a semiconductor wafer; and
   comparing the received operational data with a previously established fault model data.

9. The method of claim 8, wherein detecting the fault comprises detecting at least one of a process fault and an operational fault associated with the processing tool.

10. An apparatus, comprising:
    an interface adapted to receive operational data associated with processing a lot of semiconductor wafers; and
    a control unit communicatively coupled to the interface, the control unit adapted to:
    detect a fault based on the operational data;
    determining a plurality of possible causes of the detected fault;
    identifying a more likely possible cause out of the plurality of possible causes; and
    provide fault information associated with the identified more likely possible cause to a process controller that is capable of adjusting processing of a next lot of semiconductor wafers based on the fault information.

11. The apparatus of claim 10, wherein the control unit is adapted to receive prediction data from a predictor unit, wherein the predictor unit is representative of a process model for processing the next lot of semiconductor wafers based on at least the fault information.

12. The apparatus of claim 11, wherein the control unit is further adapted to receive operational data associated with the processing of the next lot of semiconductor wafers.

13. The apparatus of claim 12, wherein the control unit is adapted to compare the prediction data with the operational data associated with the next lot of semiconductor wafers.

14. The apparatus of claim 13, wherein the control unit is adapted to determine new fault information related to another possible cause of the detected fault if the prediction data does not substantially match the operational data associated with the next lot of semiconductor wafers.

15. The apparatus of claim 14, wherein the control unit is adapted to provide the new fault information to the process controller to adjust the processing of one or more semiconductor wafers to be processed next based on the new fault information.

16. The method of claim 13, wherein the control unit is adapted to identify a possible cause of the detected fault in response to determine that the predication data and the processed data substantially match.

17. The apparatus of claim 11, wherein the control unit is further adapted to:

receive the operational data from a processing tool related to the manufacture of the one or more semiconductor wafers; and compare the received operational data with a previously established fault model data.

18. The apparatus of claim 17, wherein the control unit is adapted to detect at least one of a process fault and an operational fault associated with the processing tool.

19. An apparatus, comprising:

means for processing at least one workpiece under a control of a controller;

means for detecting a fault associated with the processing of the at least one workpiece;

means for determining a plurality of possible causes of the detected fault;

means for identifying a more likely possible cause out of the plurality of possible causes;

means for providing fault information associated the identified more likely possible cause to the controller; and means for adjusting the processing of at least one workpiece to be processed next based on the information provided to the controller.

20. An article comprising one or more machine-readable storage media containing instructions that when executed enable a processor to:

detect a fault based on receiving operational data associated with processing of one or more wafers;

determine a plurality of possible causes of the detected fault;

identify a more likely possible cause out of the plurality of possible causes; and provide fault information associated with the identified more likely possible cause to a control unit that is capable of adjusting a processing of at least one of a next wafer based on the fault information.

21. The article of claim 20, wherein the instructions when executed enable the processor to adjust one or more operating recipe parameters for the next wafer to be processed based at least on the fault information.

22. The article of claim 19, wherein the instructions when executed enable the processor to provide the fault information and the one or more operating recipe parameters to a predictor unit.

23. The article of claim 22, wherein the instructions when executed enable the processor to generate prediction data based on the one or more operating recipe parameters and the fault information.

24. The article of claim 23, wherein the instructions when executed enable the processor to compare the prediction data and processed data, and, in response to determining that the prediction data and the processed data do not substantially match, identify another possible cause from the plurality of causes and provide new fault information related to the another possible cause of the detected fault to the control unit.

25. The article of claim 23, wherein the instructions when executed enable the processor to compare the prediction data and processed data, and, in response to determining that the prediction data and the processed data do substantially match, identify a possible cause from the plurality of causes.

26. A system, comprising:

a processing tool adapted to provide operational data associated with a processing of one or more wafers;

a fault detection and classification system adapted to:
  detect a fault based on the operational data;
  detect a plurality of possible fault causes of the detected fault;
  identify a more likely possible cause out of the plurality of possible causes;
  provide fault information associated with the identified more likely possible cause to the control unit; and a control unit adapted to adjust a processing of at least one wafer to be processed next based on at least one of the possible fault causes.

27. The system of claim 26, further comprising an advanced process control framework coupled between the processing tool and the fault detection and classification unit.

* * * * *